United States Patent
Thurmond (10) Patent No.: US 9,472,833 B1
(45) Date of Patent: Oct. 18, 2016

(54) METHODS AND APPARATUSES RELATING TO ZINC-AIR BATTERIES

(71) Applicant: Abigail Thurmond, Los Angles, CA (US)

(72) Inventor: Abigail Thurmond, Los Angles, CA (US)

(*) Notice: Subject to any disclaimer, the term of this patent is extended or adjusted under 35 U.S.C. 154(b) by 0 days.

(21) Appl. No.: 15/195,572

(22) Filed: Jun. 28, 2016

(51) Int. Cl.
| | |
|---|---|
| *H01M 12/08* | (2006.01) |
| *H01M 4/13* | (2010.01) |
| *H01M 4/36* | (2006.01) |
| *H01M 4/42* | (2006.01) |
| *H01M 4/86* | (2006.01) |
| *H01M 4/90* | (2006.01) |
| *H01M 4/96* | (2006.01) |
| *H01M 2/16* | (2006.01) |
| *H01M 8/04* | (2016.01) |

(Continued)

(52) U.S. Cl.
CPC ............ *H01M 12/08* (2013.01); *H01M 2/166* (2013.01); *H01M 4/134* (2013.01); *H01M 4/366* (2013.01); *H01M 4/42* (2013.01); *H01M 4/8657* (2013.01); *H01M 4/9016* (2013.01); *H01M 4/96* (2013.01); *H01M 8/04089* (2013.01); *H01M 8/04395* (2013.01); *H01M 8/04753* (2013.01); *H01M 10/0565* (2013.01); *H01M 2004/027* (2013.01); *H01M 2004/8689* (2013.01); *H01M 2300/0085* (2013.01)

(58) Field of Classification Search
CPC .. H01M 12/08; H01M 12/06; H01M 12/065; H01M 2/166; H01M 4/134; H01M 4/366; H01M 4/42; H01M 4/8657; H01M 4/9016; H01M 4/96; H01M 2004/027; H01M 2004/8689; H01M 2300/0085

USPC .................................................. 429/405, 406
See application file for complete search history.

(56) References Cited

U.S. PATENT DOCUMENTS

| | | | |
|---|---|---|---|
| 3,575,727 A | 4/1971 | Arrance et al. | |
| 8,728,671 B1 * | 5/2014 | Brost | .................... H01M 12/06 429/405 |

(Continued)

FOREIGN PATENT DOCUMENTS

| | | |
|---|---|---|
| CN | 103811772 | 5/2014 |
| CN | 102945969 | 10/2014 |
| CN | 104538647 | 4/2015 |

OTHER PUBLICATIONS

Park et al. "Electrospoun Porous Nanorod Perovskite Oxide/Nitrogen-Doped Graphene Composite as a Bi-Functional Catalyst for Metal Air Batteries"; Nano Energy (2014) 10, pp. 192-200.*

*Primary Examiner* — Gregg Cantelmo
(74) *Attorney, Agent, or Firm* — Knobbe, Martens, Olson & Bear, LLP (57) ABSTRACT

A zinc-air battery including an anode which has a zinc-containing portion with a coating on one or more surfaces is disclosed. The coating may comprise a metal other than zinc, such as elemental nickel. The zinc-air battery can include a cathode which has bifunctional catalyst configured to catalyze both an oxygen gas reduction reaction and an oxygen gas evolution reaction. The bifunctional catalyst may have an inner core and an outer shell, wherein the inner core catalyzes the oxygen evolution reaction and the shell catalyzes the oxygen reduction reaction. The zinc-air battery may include a separator which has magnesium oxide (MgO), such as magnesium oxide powder. The separator may have an outer portion that includes a polymeric material which incorporates the magnesium oxide, and an inner portion which includes a solid state polymer gel electrolyte.

19 Claims, 5 Drawing Sheets

(51) Int. Cl.
  *H01M 4/134* (2010.01)
  *H01M 10/0565* (2010.01)
  *H01M 4/02* (2006.01)

(56) References Cited

U.S. PATENT DOCUMENTS

| | | | |
|---|---|---|---|
| 8,883,358 B2 | 11/2014 | Takahashi et al. | |
| 9,017,897 B2 | 4/2015 | Jain et al. | |
| 9,054,394 B2 | 6/2015 | Sammells | |
| 2007/0045106 A1 | 3/2007 | Yang et al. | |
| 2007/0166602 A1* | 7/2007 | Burchardt | H01M 4/8652 429/406 |
| 2012/0082921 A1* | 4/2012 | Kruglick | H01M 12/08 429/532 |
| 2013/0157149 A1 | 6/2013 | Peled et al. | |
| 2014/0023939 A1* | 1/2014 | Chen | H01M 4/9016 429/405 |

* cited by examiner

METHODS AND APPARATUSES RELATING TO ZINC-AIR BATTERIES

BACKGROUND

1. Field

The present application relates to energy storage devices, and particularly to zinc-air batteries.

2. Description

Zinc-air batteries can have an anode which comprises zinc and a cathode configured to provide a supply of oxygen gas. The cathode may be configured to allow flow therethrough of ambient air such that oxygen from the ambient air can serve as a cathode active material. Oxygen from the ambient air can be used to produce hydroxide anions, such as by reaction of the oxygen with water within the cathode, and the hydroxide anions can then react with zinc at the anode to release electrons.

Zinc-air batteries can be made into a variety of shapes and sizes, and can have numerous applications. For example, zinc-air battery cells can be prismatic or cylindrical. Button cells of zinc-air batteries can be used to power smaller electronic devices, including hearing aids and/or watches. Larger zinc-air batteries can be used to power electric vehicles, cameras, mobile electronic devices, communication devices, and/or used in various energy storage applications, including in energy storage for power grids.

SUMMARY

Various embodiments of the present invention relate to zinc-air batteries. According to an embodiment, a zinc-air battery can have an anode which includes a zinc-containing portion comprising a coating on one or more surfaces of the zinc-containing portion. The coating may comprise a metal other than zinc. For example, the coating may consist essentially of a metal other than zinc. In some embodiments, the coating may be configured to reduce or prevent corrosion of the zinc-containing portion of the anode. In some embodiments, the coating comprises elemental nickel. For example, the coating may consist essentially of elemental nickel or can be a nickel-metal alloy. In some embodiments, the zinc-containing portion comprises a zinc sheet such that an elemental nickel coating is on one or more surfaces of the zinc sheet. In some embodiments, the zinc-containing portion can have an elemental nickel coating on a surface adjacent to a separator of the zinc-air battery. In an embodiment, the zinc-air battery can have a cathode comprising one or more units of a bifunctional catalyst, where the bifunctional catalyst is configured to catalyze both a reaction for increasing oxygen gas ($O_2$) concentration within the cathode and a reaction for chemically reducing oxygen gas. In some embodiments, the cathode can include a plurality of the units of the bifunctional catalyst. For example, the cathode may comprise a portion filled or substantially filled with the plurality of units of the bifunctional catalyst.

In some embodiments, the bifunctional catalyst can have an inner core surrounded or substantially surrounded by an outer shell. The inner core of the bifunctional catalyst can be configured to facilitate an increase in oxygen concentration within the cathode. For example, the inner core can have a composition and/or structure configured to catalyze an oxygen evolution reaction. In some embodiments, the inner core comprises an organic mesoporous perovskite lanthanum strontium cobalt oxide. The outer shell of the bifunctional catalyst can be configured to catalyze a chemical reaction for reducing oxygen gas. For example, the outer shell of the catalyst may have a composition and/or structure configured to catalyze a reaction for producing hydroxide anions ($OH^-$) from oxygen gas. In some embodiments, the outer shell comprises a nitrogen-doped carbon material, including nitrogen-doped carbon nanotubes, carbon nanofibers and/or carbon particles.

In one embodiment, the zinc-air battery comprises an electrically and/or thermally insulating separator comprising magnesium oxide (MgO) between the anode and the cathode. In some embodiments, the separator comprises an inner portion surrounded or substantially surrounded by an outer portion, where the outer portion comprises the magnesium oxide. In some embodiments, the outer portion of the separator comprises a polymeric material and magnesium oxide powder. The magnesium oxide powder may be incorporated into the polymeric material. For example, the outer portion may comprise a polymer film into which the magnesium oxide powder is incorporated. In some embodiments, the outer portion comprises magnesium oxide powder uniformly or substantially uniformly distributed throughout the polymeric material. In some embodiments, the polymeric material is a polysulfonium film. In some embodiments, the inner portion comprises an electrolyte. For example, the electrolyte can be aqueous, non-aqueous, hybrid, and/or solid state. In some embodiments, the electrolyte may comprise potassium hydroxide and/or may be a solid state polymer gel. For example, the separator may comprise a polymer gel electrolyte inner portion surrounded or substantially surrounded by a polysulfonium film comprising magnesium oxide powder incorporated therein.

In an embodiment, a zinc-air battery comprises an anode comprising a zinc-containing portion and a metal coating on at least one surface of the zinc-containing portion, wherein the metal coating comprises an elemental nickel coating; a cathode comprising one or more openings configured to allow air flow within the cathode and at least one unit of a bifunctional catalyst, wherein the bifunctional catalyst is configured to catalyze both an oxygen reduction reaction and an oxygen evolution reaction, wherein the bifunctional catalyst comprises an outer shell and an inner core, wherein the outer shell comprises nitrogen-doped carbon and the inner core comprises mesoporous perovskite lanthanum strontium cobalt oxide; and an electrically insulating separator between the anode and the cathode, wherein the insulating separator comprises magnesium oxide (MgO).

In some embodiments, the nitrogen-doped carbon comprises carbon nanotubes. In certain embodiments, the metal coating is on a surface of the zinc-containing portion opposite and facing the cathode. For example, the metal coating can be on a surface of the zinc-containing portion adjacent to the separator. Also, in some embodiments, the metal coating can comprise about 70% zinc and about 30% nickel.

In certain embodiments, the inner core of the bifunctional catalyst is configured to catalyze the oxygen evolution reaction, and the outer shell of the bifunctional catalyst is configured to catalyze the oxygen reduction reaction. In some embodiments, the bifunctional catalyst is positioned in a ladder-like configuration within the cathode. In other embodiments, the bifunctional catalyst is located within one or more portions within the cathode, wherein the one or more portions comprise a cylinder shape. For example, the one or more portions can extend from a single wall of the cathode.

In some embodiments, the electrically insulating separator comprises magnesium oxide (MgO) powder. For example, the electrically insulating separator can comprise an outer portion surrounding an inner portion, wherein the outer portion of the electrically insulating separator comprises the magnesium oxide powder. In certain embodiments, the outer portion comprises a polymer and wherein the magnesium oxide powder is distributed within the polymer. Further, in some embodiments, the polymer can comprise polysulfonium. Also, in certain embodiments, the inner portion of the electrically insulating separator comprises a solid state polymer gel electrolyte.

In some embodiments, the zinc-air battery comprises an electrolyte, wherein the electrolyte comprises potassium hydroxide and one or more gelling agents, wherein the one or more gelling agents are configured to limit passage of oxygen while facilitating ion mobility between the cathode and the anode. In certain embodiments, the zinc-air battery comprises one or more fans configured to facilitate air flow into and/or out of the cathode. In some embodiments, the zinc-air battery comprises one or more pressure sensors configured to determine a pressure level within the cathode. Further, in some embodiments, the zinc-air battery comprises: one or more pressure sensors configured to determine a pressure level within the cathode; and one or more fans configured to facilitate air flow into and/or out of the cathode to maintain the pressure level within the cathode at a desirable level, wherein the pressure level within the cathode determined by the one or more pressure sensors determines a desired speed of the one or more fans.

In some embodiment, the zinc-air battery comprises one or more openings that are located on a single wall of the cathode. Further, in certain embodiments, the cathode comprises porous carbon configured to facilitate air flow within the cathode.

For purposes of summarizing the invention and the advantages achieved over the prior art, certain objects and advantages are described herein. Of course, it is to be understood that not necessarily all such objects or advantages need to be achieved in accordance with any particular embodiment. Thus, for example, those skilled in the art will recognize that the invention may be embodied or carried out in a manner that can achieve or optimize one advantage or a group of advantages without necessarily achieving other objects or advantages.

All of these embodiments are intended to be within the scope of the invention herein disclosed. These and other embodiments will become readily apparent to those skilled in the art from the following detailed description having reference to the attached figures, the invention not being limited to any particular disclosed embodiment(s).

BRIEF DESCRIPTION OF THE DRAWINGS

These and other features, aspects, and advantages of the present disclosure are described with reference to the drawings of certain embodiments, which are intended to illustrate certain embodiments and not to limit the invention.

DETAILED DESCRIPTION

Although certain embodiments and examples are described below, those of skill in the art will appreciate that the invention extends beyond the specifically disclosed embodiments and/or uses and obvious modifications and equivalents thereof. Thus, it is intended that the scope of the invention herein disclosed should not be limited by any particular embodiments described below.

With the development of battery technology, many types of different battery compositions have been developed, including for example lithium ion and nickel metal hydride batteries. In particular, such batteries can be used for electric vehicles. However, lithium ion and/or nickel metal hydride batteries tend to lose their functional capacity with time through aging. Some of the problems that lead to lithium ion and nickel metal hydride battery aging include high internal resistance, hydrogen evolution reaction, corrosion, temperature, and high self-discharge. These problems can also reduce the batteries' lifespan, rechargeability, and/or energy efficiency. As such, one or more embodiments disclosed herein are configured to reduce such effects of battery aging and to create a battery with better energy efficiency, lifespan, and/or rechargeability for use in a variety of applications, including for example in electric vehicles.

Overview

Figure 1:
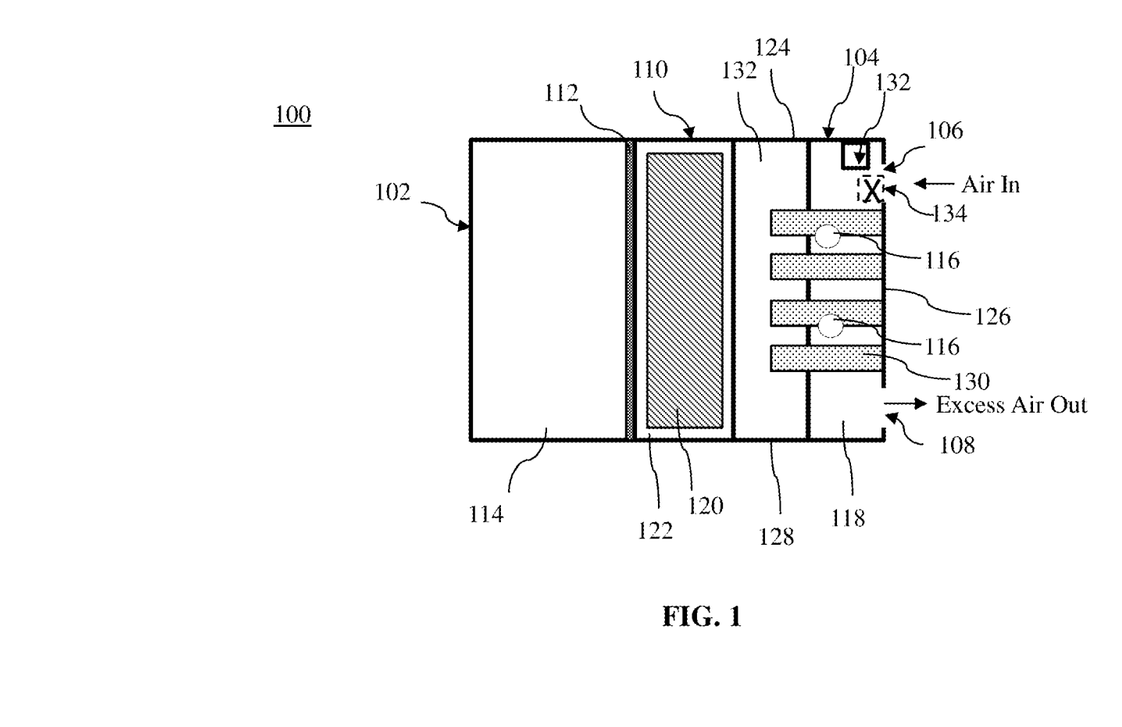
FIG. 1 is a schematic cross-sectional view of an example of a zinc-air battery, according to some embodiments.

FIG. 1 is a schematic cross-sectional view of an example of a zinc-air battery 100, according to some embodiments. As shown, the zinc-air battery 100 can include an anode 102, a cathode 104, and an electrically and/or thermally insulating separator 110 between the anode 102 and the cathode 104. The anode 102 can include a zinc-containing portion 114 and a coating 112 over a surface of the zinc-containing portion 114. As shown in FIG. 1, in some embodiments, the coating 112 can be on a surface of the zinc-containing portion 114 which faces the cathode 104. As described in further detail herein, the coating 112 can be configured to reduce and/or prevent corrosion of the zinc-containing portion 114. In some embodiments, the coating 112 can comprise a metal other zinc, such as nickel. For example, the coating 112 may consist essentially of elemental nickel. The cathode 104 can comprise a bifunctional catalyst 116.

Cathode

The cathode 104 may comprise a catalytic active layer 118 and a gas diffusion layer 132. In some embodiments, the catalytic active layer 118 and the gas diffusion layer 132 can be substantially the same. For example, the catalytic active layer 118 and the gas diffusion layer 132 can comprise substantially the same volume and/or substantially overlap with each other. In other embodiments, the catalytic active layer 118 and gas diffusion layer 132 are separate. In certain embodiments, the catalytic active layer 118 and gas diffusion layer 132 comprise different volumes but overlap with each other such that a portion of the catalytic active layer 118 and a portion of the gas diffusion layer 132 are substantially the same.

The cathode 104 may comprise one or more portions 130 configured to facilitate gas diffusion within the gas diffusion layer 132. In some embodiments, the one or more portions 130 can comprise porous carbon and/or other materials configured to facilitate gas diffusion. In certain embodiments, the one or more portions 130 can comprise a ladder-like and/or otherwise dispersed configuration as shown in FIG. 1.

The cathode 104 may comprise a bifunctional catalyst 116. In some embodiments, the bifunctional catalyst 116 may be positioned throughout the cathode 104. In other embodiments, the bifunctional catalyst 116 may be positioned only throughout one or more portions of the cathode 104. For example, the bifunctional catalyst 116 can be positioned within and/or throughout a catalytic active layer 118. In certain embodiments, the bifunctional catalyst 116 can be positioned within and/or in proximity to one or more portions 130 comprising porous carbon.

In terms of volume, a portion in which the bifunctional catalyst is positioned can be about 100%, about 90%, about 80%, about 70%, about 60%, about 50%, about 40%, about 30%, about 20%, about 10%, about 0% of the total volume of the cathode 104 and/or within a range defined by two of the aforementioned values. The percentage of the cathode 104 that comprises the bifunctional catalyst 116 can be determined to maximize contact between the air and/or oxygen gas and the bifunctional catalyst 116 while not taking up so much space as to hinder the flow or air within the cathode 104. For example, an optimum volumetric percentage of the cathode 104 comprising the bifunctional catalyst 116 can be within a range between about 15% and about 45% or within a range between about 20% and 40%.

In some embodiments, the bifunctional catalyst 116 is scattered throughout the cathode 104 to allow for air and/or oxygen gas to come into contact with the bifunctional catalyst 116 as the air and/or oxygen gas moves through the cathode 104. For example, the bifunctional catalyst 116 can be scattered throughout the cathode 106 in a ladder-like or other dispersed configuration. In some embodiments, as shown in FIG. 1, the bifunctional catalyst 116 can be positioned within and/or in proximity to one or more portions 130 comprising a ladder-like or other dispersed configuration. In certain embodiments, each of the one or more portions 118 can comprise a ladder-like, column-like, and/or one or more cylindrical structures within the cathode 104. In certain embodiments, the one or more portions 118 comprising the bifunctional catalyst 116 can protrude and/or extend from one or more walls 124, 126, 128 of the cathode 104. For example, all of the one or more portions 118 can protrude and/or extend from a single wall of the cathode 104, such as wall 124, wall 126, or wall 128. In other embodiments, a subset of the one or more portions 118 can protrude and/or extend from one or more of wall 124, wall 126, and/or wall 128.

In some embodiments, the one or more portions 118 of the cathode 104 may have a space filled or substantially filled with the bifunctional catalyst 116 and/or porous carbon. As described in further detail herein, the bifunctional catalyst 116 may comprise a first portion configured to catalyze an oxygen evolution reaction and a second portion configured to catalyze an oxygen reduction reaction. For example, ambient air entering the cathode 104 may subsequently flow through the bifunctional catalyst 116, such that the bifunctional catalyst 116 can facilitate providing an increased concentration of oxygen gas within the cathode 104 and production of hydroxide ions from the oxygen gas at the cathode 104, the hydroxide ions then traveling to the anode 102 to react with the zinc. In some embodiments, the bifunctional catalyst 116 can be configured to catalyze an oxygen reduction reaction during discharge and catalyze an oxygen evolution reaction during charge.

In some embodiments, the cathode 104 can comprise one or more openings. For example, in certain embodiments, the cathode 104 can comprise a first opening 106 and a second opening 108, each of the first opening 106 and the second opening 108 being configured for flow of ambient air into and/or out of the cathode 104. For example, oxygen gas in ambient air may enter the cathode 104 through the first opening 106 and/or the second opening 108. The oxygen gas which enters the cathode 104 can be converted to hydroxide anions at the cathode 104, and the hydroxide anions can travel through the separator 110 to the anode 102 to react with zinc at the anode 102.

FIG. 1 shows the first opening 106 and the second opening 108 on a same wall 126 of the cathode 104. In some embodiments, the first opening 106 and the second opening 108 may be on a single wall of the cathode 104. For example, both the first opening 106 and the second opening 108 may be on one of walls 124, 126, 128. In other embodiments, the first opening 106 and the second opening 108 may not be positioned on opposing walls 124, 126 of the cathode 104. In certain embodiments, the first opening 106 and second opening 108 may be positioned on adjacent walls of the cathode 104, such as walls 124 and 126 or walls 126 and 128 of the cathode 104.

In some embodiments, the cathode 104 can include fewer or more openings configured for flow of oxygen gas into the cathode 104. For example, the cathode 104 can include 1, 2, 3, 4, 5, 6, 7, 8, 9, or 10 openings and/or the number of openings can be within a range defined by two of the aforementioned values. The configuration, position and/or the number of openings of the cathode 104 may be selected to allow desired ambient air flow into and/or out of the battery 100 so as to provide desired flow of oxygen gas into and/or out of the cathode 104.

In some embodiments, the cathode 104 can comprise one or more fans 134. One or more fans 134 can be configured to increase and/or decrease the amount of air flow into the cathode 104. The one or more fans 134 can be controllable to provide a desired flow of air and/or oxygen gas into and/or out of the battery 100. For example, the one or more fans 134 can be located proximate to and/or substantially near the one or more openings 106, 108.

In certain embodiments, the cathode 104 can comprise one or more pressure sensors 132. The one or more pressure sensors 132 can be configured to determine a current pressure within the cathode 104. Based on the sensed pressure within the cathode 104, the battery can be further configured to increase and/or decrease the speed of the one or more fans 134 as to control the amount of air and/or the pressure within the cathode 104. If too much or too little air is brought into the cathode, for example via the one or more fans 134, the rate of the oxygen evolution reaction, oxygen reduction reaction, charge, and/or discharge of the battery can be affected resulting in undesirable results. On the contrary, if more air is brought into the cathode, this may facilitate the charge and/or discharge rate by ensuring that the amount of air and/or oxygen gas is not the limiting reactant.

Further, by providing one or more pressure sensors 132, pressure levels within the cathode 104 can be maintained at a desirable level via the one or more fans 134 as to ensure that the battery 100 is stable. For example, one or more walls 124, 126, 128 of the cathode 104 and/or one or more walls of the separator 120 adjacent to the cathode 104 can have a threshold pressure point, above which the one or more walls can be punctured or otherwise damaged. By utilizing one or more pressure sensors 132 in conjunction with one or more fans 134, a desirable rate of air flow and/or volume of air within the cathode 104 can be maintained while preserving the operational safety of the battery in terms of pressure.

Based on the materials used for the one or more walls 124, 126, 128 of the cathode and the outer portion 122 of the separator 120, a threshold pressure value and/or desirable range of pressure for the structural integrity of the battery 100 can be determined. Further, based on the porous capability of the porous carbon and/or the rate of the bifunctional catalyst 116, a desirable range of pressure and/or volume and/or mass of air and/or oxygen gas within the cathode 104 can be determined. For example, a desirable range of pressure considering only the structural integrity of the battery 100, only the rate of oxygen reduction and/or evolution, and/or a combination of one or more of the above parameters, can be within a range defined by about 0.1 atm, about 0.2 atm, about 0.3 atm, about 0.4 atm, about 05 atm, about 0.6 atm, about 0.7 atm. about 0.8 atm, about 0.9 atm, about 1.1 atm, about 1.2 atm, about 1.3 atm, about 1.4 atm. about 1.5 atm, about 1.6 atm. about 1.7 atm, about 1.8 atm, about 1.9 atm, about 2.0 atm. about 2.2 atm, about 2.4 atm, about 2.6 atm, about 2.8 atm. and/or about 3.0 atm.

In some embodiments, the one or more fans 134 and/or one or more pressure sensors 132 can be configured to operate automatically as to maintain an air flow and/or pressure within the cathode 104 within a desirable range. In certain embodiments, the one or more fans 134 and/or one or more pressure sensors 132 can be configured to be operated by a user via a user access point system to maintain an air flow and/or pressure within the cathode 104 within a desirable range. In some embodiments, the one or more fans 134 and/or one or more pressure sensors 132 can be programmed to operate automatically as to maintain an air flow and/or pressure within the cathode 104 at a range specified at the time of manufacturing the battery 100.

Referring again to FIG. 1, the zinc-air battery 100 can include a separator 110 comprising an inner portion 120 surrounded or substantially surrounded by an outer portion 122. In some embodiments, the outer portion 122 comprises a polymeric material and/or magnesium oxide. The magnesium oxide, such as a magnesium oxide powder, may be incorporated throughout the polymeric material. In some embodiments, the inner portion 120 may comprise an electrolyte. The electrolyte can be aqueous, non-aqueous, hybrid, or solid state. The electrolyte can comprise KOH or other known electrolytes. For example, the electrolyte can be a solid state polymer gel electrolyte comprising KOH. The separator 110 may be electrically and/or thermally insulating while being configured to provide desired ionic transport between the anode 102 and the cathode. For example, hydroxide ions generated at the cathode 104 may travel through the separator 110 to the anode 102 such that the hydroxide ions can react with the zinc at the anode 102 to release electrons.

Anode

Figure 2:
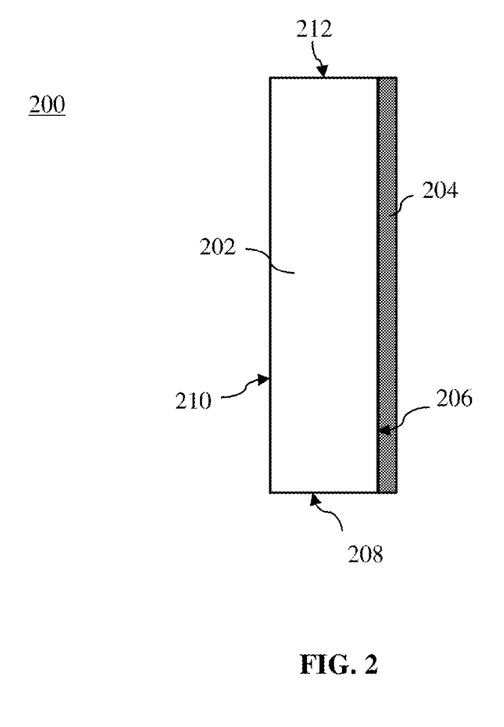
FIG. 2 is a schematic cross-sectional view of an example of an anode of a zinc-air battery, according to some embodiments.

FIG. 2 shows a schematic cross-sectional view of an example of an anode 200. The anode 200 may be the anode 102 as described with reference to FIG. 1. The anode 200 may comprise a zinc-containing portion 202. In some embodiments, as shown in FIG. 2, a cross-section of the zinc-containing portion 202 can have a rectangular or substantially rectangular shape and comprise surfaces 206, 208, 210 and 212. In some embodiments, the zinc-containing portion 202 comprises a metallic sheet, such as a zinc-containing sheet. In some embodiments, the metallic sheet consists essentially of elemental zinc. In some embodiments, the zinc-containing portion 202 is a zinc foil. Other configurations of zinc can be used in other embodiments, such as for example zinc blocks, spheres, powder, or the like.

The zinc-containing portion 202 may have a coating 204 on one of its surfaces. In some embodiments, the coating 204 can comprise a metal other than zinc. The coating 204 may comprise elemental nickel. For example, the coating 204 may consist essentially of elemental nickel. In certain embodiments, the coating 204 can comprise a nickel and one or more other metals. In some embodiments, the coating 204 can prevent or substantially prevent corrosion of the zinc by preventing and/or lowering unwanted anodic reactions from occurring. For example, the coating 204 can be configured to reduce anodic corrosion, over-potential for hydrogen evolution reactions, increase the barrier for activation energy in the overall battery reaction, and/or increase the battery cell surface area. In other words, in certain embodiments, the coating 204 can comprise nickel which functions as a catalyst. In some embodiments, a zinc-air battery can include a zinc-containing portion 202 consisting essentially of zinc metal sheet, such as a zinc foil, and a coating 204 consisting essentially of elemental nickel on one or more surfaces of the zinc metal sheet.

In some embodiments, the zinc-containing portion 202 and coating 204 comprise a nickel-metal zinc alloy. The nickel can be alloyed to the zinc to form a protective film layer. For example, the nickel-metal zinc alloy can be made out of about 70% zinc and 30% nickel. In other embodiments, the ratio of zinc to nickel in mass can be about 90% zinc and 10% nickel, about 80% zinc and 20% nickel, about 70% zinc and 30% nickel, about 60% zinc and 40% nickel, about 50% zinc and 50% nickel, about 40% zinc and 60% nickel, about 30% zinc and 70% nickel, about 20% zinc and 80% nickel, about 10% zinc and 90% nickel, and/or within a range defined by two of the aforementioned ratios.

FIG. 2 shows that the coating 204 may be on the surface 206 of the zinc-containing portion 202. The coating 204 may cover or substantially cover the surface 206. In other embodiments, the coating 204 can cover only a portion of the surface 206. In some embodiments, the coating 204 can be on a surface of the zinc-containing portion 202 configured to be facing a cathode. For example, the surface 206 may be configured to be facing the cathode. In some embodiments, the coating 204 can be on a surface of the zinc-containing portion 202 configured to be proximate to a separator (e.g., the separator 110 of FIG. 1), such as a surface of the zinc-containing portion 202 adjacent to the separator. For example, the surface 206 may be configured to be adjacent to the separator. In some embodiments, the coating 204 may be only or substantially only on a surface of the zinc-containing portion 202 adjacent to the separator.

In some embodiments, the zinc-containing portion 202 can have a prismatic shape. For example, in certain embodiments, the zinc-containing portion 202 can comprise a rectangular or square block shape. In some embodiments, the zinc-containing portion 202 can have a curved shape, such as a circular or substantially circular shape. A shape of the zinc-containing portion 202 can be selected based on a corresponding shape of the zinc-air battery and/or other device parameters, such as desired device electrical performance. In some embodiments, the zinc-containing portion 202 can be a prismatic metal sheet, such as a prismatic zinc metal sheet. In some embodiments, the zinc-containing portion 202 can be a metal sheet comprising a rounded shape.

In some embodiments, the coating 204 can be on more than one surface of the zinc-containing portion 202. In some embodiments, the coating 204 can be on all or substantially all surfaces of the zinc-containing portion 202. For example, the coating 204 may be on all four surfaces 206, 208, 210 and 212 of the zinc-containing portion 202. In some embodiments, the coating 204 can be only on two opposing surfaces of the zinc-containing portion 202, such as a surface facing the cathode and its opposing surface. For example, the coating 204 may be only on surfaces 206 and 210 of the zinc-containing portion 202 shown in FIG. 2.

In some embodiments, the coating 204 can be deposited on one or more surfaces of the zinc-containing portion 202 using an electroplating process, an electro-galvation process. For example, the zinc-containing portion 202 can be alloyed with a nickel-metal catalyst layer using electroplating. In some embodiments, one or more surfaces of the zinc-containing portion 202 which will be coated can be treated with an electroplating process to deposit the coating 204. For example, the zinc-containing portion 202 can be alloyed with a nickel-metal catalyst layer via electroplating based on the electrochemical potential reaction of Ni2++ 2e−=Ni, wherein the electrode potential can be −0.23 volts. In certain embodiments, the coating 204 can be deposited on the zinc-containing portion 202 prior to incorporating the anode 200 into a zinc-air battery.

In some embodiments, the coating 204 can advantageously reduce or prevent corrosion of the zinc-containing portion 202 of the anode 200. The coating 204 may reduce or prevent oxidation of the zinc-containing portion 202 and/or one or more surfaces thereof, such as by providing a protective layer and/or a protective film between the one or more surfaces and one or more oxidants. In some embodiments, a thickness of the coating 204 on one or more surfaces of the zinc-containing portion 202 can be selected to facilitate desired ionic transport therethrough while providing protection against corrosion. In some embodiments, a thickness of the coating 204, which can comprise an elemental nickel layer in certain embodiments, can be about 0.1 cm, about 0.2 cm, about 0.3 cm, about 0.4 cm, about 0.5 cm, about 0.6 cm, about 0.7 cm, about 0.8 cm, about 0.9 cm, about 1.0 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, about 2.1 cm, about 2.2 cm, about 2.3 cm, about 2.4 cm, about 2.5 cm, about 2.6 cm, about 2.7 cm, about 2.8 cm, about 2.9 cm, about 3.0 cm, about 4 cm, about 5 cm, about 6 cm, about 7 cm, about 8 cm, about 9 cm, about 10 cm, and/or within a range defined by any two of the aforementioned values. It can be advantageous, for example, for the thickness of the coating 204 to be within a range between about 0.5 cm and about 3.0 cm.

Electrolyte

Referring the FIG. 1, the cathode, anode, and/or portions thereof can comprise electrolytes. For example, in some embodiments, portions within the cathode 104 other than those portions of the porous carbon 130 and bifunctional catalyst 116 can substantially be filled with electrolytes. Similarly, in the anode 102, portions other than those filled by zinc can substantially be filled with electrolytes. Composition of the electrolytes present in the cathode 104 and anode 106 can be the same in some embodiments. In other embodiments, composition of the electrolytes present in the cathode 104 and anode 106 can be different. In some embodiments, electrolytes present in the cathode 104 and/or anode 106 can be the same or different as electrolytes present in the inner portion of the separator as described herein.

The electrolytes can be aqueous, non-aqueous, hybrid, and/or solid state. In certain embodiments, the electrolyte can comprise potassium hydroxide and/or other known electrolytes. For example, the electrolyte can be a solid state polymer gel electrolyte comprising potassium hydroxide. Depending on the electrolyte, one or more features and/or specifications of the battery may differ. For example, aqueous potassium hydroxide electrolytes may have problems with hydroxide evolution reactions and $CO_2$ over-potential that can affect the battery's energy storage and/or aging.

Bifunctional Catalyst

Figure 3:
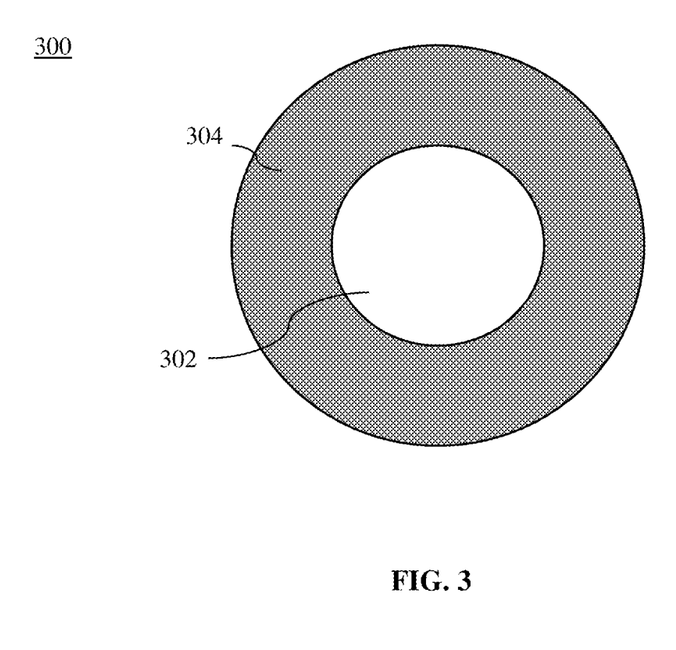
FIG. 3 is a schematic cross-sectional view of an example of a bifunctional catalyst of a zinc-air battery, according to some embodiments.

FIG. 3 is a schematic cross-sectional view of an example of a bifunctional catalyst 300, according to some embodiments. The bifunctional catalyst 300 can be the bifunctional catalyst 116 of FIG. 1. For example, the cathode 104 may comprise one or more of the bifunctional catalysts 300. In some embodiments, the cathode 104 comprises a plurality of the bifunctional catalysts 300. In some embodiments, at least a portion of the cathode 104 comprises the bifunctional catalyst 300. For example, the portion 118 of the cathode 104 may be filled or substantially filled with a plurality of the bifunctional catalysts 300. In some embodiments, the cathode 104 is filled or substantially filled with a plurality of the bifunctional catalysts 300. The bifunctional catalyst 300 present in the cathode 104 can be homogeneous in some embodiments.

As described herein, the bifunctional catalyst can be configured to both catalyze a reaction for reducing oxygen gas and facilitate a reaction which increases the concentration of oxygen gas within the cathode of the zinc-air battery. For example, the bifunctional catalyst can be configured to work as an effective reducing agent that catalyzes oxygen reduction reaction during discharge and oxygen evolution reaction during charge, reducing high self-discharge and high internal resistance. Referring to FIG. 3, in some embodiments, a bifunctional catalyst 300 comprises an inner core 302 and an outer shell 304. For example, the bifunctional catalyst 300 may comprise the inner core 302 surrounded or substantially surrounded by the outer shell 304. In some embodiments, the inner core 302 can be configured to facilitate an increase in oxygen gas concentration within the cathode, including a configuration for catalyzing an oxygen evolution reaction. In some embodiments, the outer shell 304 can be configured to facilitate chemical reduction of oxygen gas, including a configuration for catalyzing an oxygen reduction reaction.

The bifunctional catalyst 300 may have a configuration to facilitate flow therethrough of ambient air which enters the cathode, such as the cathode 104, and/or facilitate contact of the ambient air which enters the cathode 104 with surfaces of the bifunctional catalyst 300. For example, the bifunctional catalyst 300 may be porous, such that air flowing into the cathode 104 can flow through and contact surfaces of the outer shell 304 where oxygen gas reduction reaction can be catalyzed and then through and contact the surfaces of the inner core 302 where the oxygen gas evolution reaction can be catalyzed. In some embodiments, the bifunctional catalyst 300 may comprise one or more portions which are mesoporous. In some embodiments, the inner core 302 and the outer shell 304 are mesoporous.

In some embodiments, the inner core 302 may comprise a structure and/or composition configured to provide increased oxygen gas concentration, such as a material configured to catalyze an oxygen gas evolution reaction. For example, the structure and/or composition of the inner core 302 can facilitate increased oxygen gas concentration within the cathode 104.

In some embodiments, the inner core comprises an oxide material. In some embodiments, the inner core 302 comprises a lanthanum strontium cobalt oxide material, such as a perovskite lanthanum strontium cobalt oxide. In some embodiments, the inner core 302 comprises an organic mesoporous perovskite lanthanum strontium cobalt oxide material. In some embodiments, the inner core 302 comprises nano-wire materials comprising the organic mesoporous perovskite lanthanum strontium cobalt oxide material.

In some embodiments, an outermost layer of the inner core 302 comprises a lanthanum strontium cobalt oxide material, such as a perovskite lanthanum strontium cobalt oxide. For example, a lanthanum strontium cobalt oxide material can coat the inner core. In certain embodiments, an outermost layer of the inner core 302 comprising a lanthanum strontium cobalt oxide material can have a thickness of about 0.1 cm, about 0.2 cm, about 0.3 cm, about 0.4 cm, about 0.5 cm, about 0.6 cm, about 0.7 cm, about 0.8 cm, about 0.9 cm, about 1.0 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, about 2.1 cm, about 2.2 cm, about 2.3 cm, about 2.4 cm, about 2.5 cm, about 2.6 cm, about 2.7 cm, about 2.8 cm, about 2.9 cm, about 3.0 cm, about 4 cm, about 5 cm, about 6 cm, about 7 cm, about 8 cm, about 9 cm, about 10 cm, and/or within a range defined by any two of the aforementioned values. It can be advantageous, for example, for the thickness of the outermost layer of the inner core to be within a range between about 0.5 cm and about 3.0 cm.

Mesoporous perovskite lanthanum strontium cobalt oxide nanowires can be configured to catalyze the electro-catalytic processes of oxygen evolution reaction. For example, oxygen gas can diffuse into the perovskite lanthanum and/or strontium crystal lattice structures to limit high diffusion current for the oxygen reduction reactions. In addition, the mesoporous silica particles in the perovskite layer can increase thermal stability within the bifunctional catalyst 300 to have higher potential reactions.

In some embodiments, the outer shell 304 comprises a structure and/or composition configured to catalyze an oxygen gas reduction reaction. In some embodiments, the outer shell 304 may comprise nitrogen-doped carbon material. For example, the nitrogen-doped carbon material of the outer shell 304 may be configured to catalyze the following oxygen reduction reaction(s) to provide hydroxide anions at the cathode 104: $O_2+H_2O+4e^- \rightarrow 4OH^-$; $O_2+H_2O+2e^- \rightarrow HO_2^-+OH^-$; $HO_2^-+H_2O+2e^- \rightarrow 3OH^-$, wherein the thermodynamic electrode potential at standard conditions for each of the above-identified reactions can be 0.401 volts, −0.065 volts, and 0.867 volts.

The hydroxide anions can then be consumed at the anode, such as the anode 102, by reaction with the zinc. In some embodiments, the nitrogen-doped carbon material comprises nitrogen-doped carbon nanotubes, carbon fibers, and/or carbon particles. For example, the outer shell 304 may comprise nitrogen-doped carbon multi-walled nanotubes encapsulated with iron nano-particles.

FIG. 3 shows that a cross-section of the unit of bifunctional catalyst 300 can comprise a rounded shape, such as a circular or substantially circular shape. Other shapes may also be suitable. For example, a cross-section of the unit of bifunctional catalyst may have a rectangular or substantially rectangular shape. The outer shell 304 may have a uniform or substantially uniform thickness. For example, the bifunctional catalyst 300 may comprise an inner core 302 having a circular or substantially circular cross-section that is surrounded or substantially surrounded by an outer shell 304 comprising a uniform or substantially uniform thickness.

In some embodiments, the bifunctional catalyst 300 and/or a collection thereof can have a spherical or substantially spherical shape. In other embodiments, the bifunctional catalyst 300 and/or a collection thereof can have a cylindrical or substantially cylindrical shape. The shape of the bifunctional catalyst 300 and/or a collection thereof can be configured to allow sufficient movement of air and oxygen within the cathode while not taking up too much volume as to hinder the air flow within the cathode.

For example, the bifunctional catalyst 300 may comprise a spherical or substantially spherical inner core 302 surrounded by an outer shell 304 having a uniform or substantially uniform thickness. In other embodiments, the bifunctional catalyst 300 may comprise a cylindrical or substantially cylindrical inner core 302 surrounded by an outer shell 304 having a uniform or substantially uniform thickness.

In some embodiments, the bifunctional catalyst 300 can have a different shape. The bifunctional catalyst 300 may have a variety of sizes and shapes. In some embodiments, the bifunctional catalyst 300 can have a prismatic shape. In some embodiments, a size and/or shape of the bifunctional catalyst 300 can be selected to provide desired catalyst packing density within the cathode 104 while facilitating desired oxygen concentration increase and oxygen reduction.

In some embodiments, a zinc-air battery comprising the bifunctional catalyst 300 can demonstrate increased power density, for example due to increased rates of charge and/or discharge and/or reduced internal electrical resistance. In some embodiments, the bifunctional catalyst 300 may facilitate increased rates of oxygen reduction reaction by lowering the activation energy of the reduction, and thereby preventing short circuiting of the battery. In some embodiments, a zinc-air battery comprising the bifunctional catalyst 300 can demonstrate increased energy density. For example, the bifunctional catalyst 300 can provide increased concentration of available oxygen, increasing the amount of energy available during charging of the battery.

Separator

Figure 4:
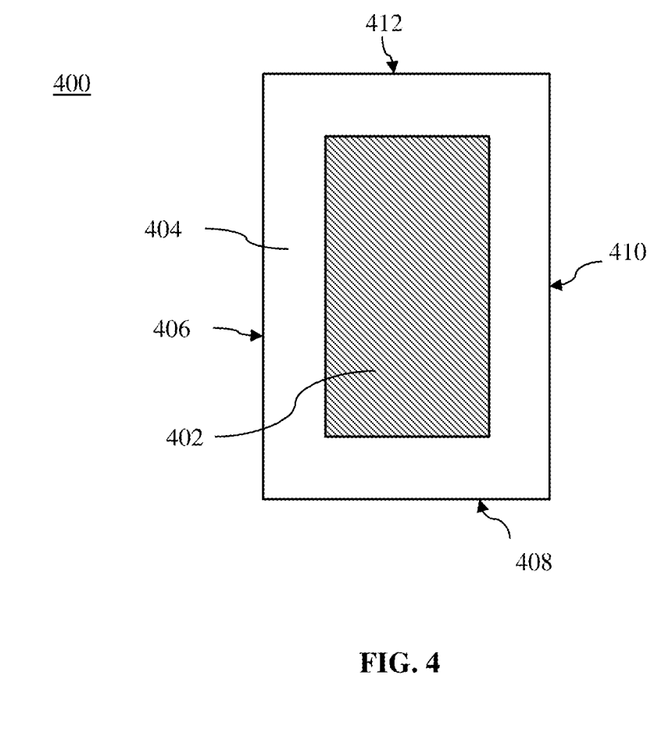
FIG. 4 is a schematic cross-sectional view of an example of a separator of a zinc-air battery, according to some embodiments.

FIG. 4 shows a schematic cross-sectional view of an example of an electrically and/or thermally insulating separator 400. The separator can be configured to provide physical isolation between the cathode and anode to prevent shorting and electrode reactions that could heat up and damage the battery. In some embodiments, the separator 110 of FIG. 1 is the separator 400 of FIG. 4. The separator 400 can comprise magnesium oxide (MgO), according to certain embodiments. The magnesium oxide may facilitate immobilization of the electrolyte, such as when the electrolyte is molten. Further, the magnesium oxide may allow ions to pass through for current flow because of its ionic bonds. For example, a separator 400 comprising magnesium oxide can be configured to function as a catalyst to allow hydroxyl ions to pass through from the anode to the cathode as well reducing the amount of thermal heat and/or energy flow. In some embodiments, the magnesium oxide comprises magnesium oxide powder.

In some embodiments, the separator 400 comprises an inner portion 402 and an outer portion 404. As shown in FIG. 4, the outer portion 404 can surround or substantially surround the inner portion 402. In some embodiments, the outer portion 404 comprises the magnesium oxide. In some embodiments, the outer portion 404 comprises a polymeric material. The outer portion 404 of the separator 400 may comprise the magnesium oxide incorporated into the polymeric material.

In some embodiments, the outer portion 404 comprises a thermoplastic polymer, such as polysulfonium. For example, the polymeric material of the outer portion 404 may consist essentially of the thermoplastic polymer, such as the polysulfonium. In some embodiments, magnesium oxide, such as magnesium oxide powder, may be incorporated into a polymeric material comprising polysulfonium. In some embodiments, the outer portion 404 comprises magnesium oxide power incorporated into a polymeric material consisting essentially of polysulfonium. In some embodiments, the magnesium oxide is uniformly or substantially uniformly distributed within the polymeric material.

In some embodiments, the inner portion 402 comprises an electrolyte. A composition of the electrolyte can be substantially the same as electrolytes present in the cathode and/or anode as described above. In certain embodiments, the composition of the electrolyte in the inner portion 402 may be different from the electrolytes present in the cathode and/or anode.

In some embodiments, the electrolyte in the inner portion 402 comprises a solid state polymer gel electrolyte. In some embodiments, the solid state polymer gel electrolyte comprises a polymer gel formed from one or more gelling agents. The gelling agents may be selected to reduce or prevent passage of oxygen gas through the separator 400 while facilitating desired flow therethrough of ions for transport between the cathode and the anode of the zinc-air battery. In some embodiments, the gelling agents comprise poly vinyl alcohol and poly ethylene glycol. In some embodiments, the solid state polymer gel electrolyte comprises a salt configured to provide ions for transport between the anode and the cathode of the zinc-air battery, such a salt comprising a hydroxide anion. In some embodiments, the salt comprises potassium hydroxide.

FIG. 4 shows that a cross-section of the separator 400 can comprise a rectangular or substantially rectangular shape, the separator 400 comprising two pairs of opposing surfaces 406 and 410, and 408 and 412. For example, a cross-section of the inner portion 402 can have a rectangular or substantially rectangular shape, and the inner portion 402 is surrounded or substantially surrounded by an outer portion 404 having a uniform or substantially uniform thickness. In certain embodiments, the thickness of the outer portion 404 can be different for each one or more walls. For example, in some embodiments, the thickness of a top and/or bottom wall of as outer portion 404, wherein the top and bottom walls are not proximate to either the cathode or the anode, can be substantially 0 cm thick, while the thickness of a left and/or right wall of the outer portion 404, wherein the left and right walls are proximate to either the cathode or the anode, are not 0 cm thick.

In certain embodiments, the outer portion 404 or one or more walls thereof can have a thickness of about 0.1 cm, about 0.2 cm, about 0.3 cm, about 0.4 cm, about 0.5 cm, about 0.6 cm, about 0.7 cm, about 0.8 cm, about 0.9 cm, about 1.0 cm, about 1.1 cm, about 1.2 cm, about 1.3 cm, about 1.4 cm, about 1.5 cm, about 1.6 cm, about 1.7 cm, about 1.8 cm, about 1.9 cm, about 2.0 cm, about 2.1 cm, about 2.2 cm, about 2.3 cm, about 2.4 cm, about 2.5 cm, about 2.6 cm, about 2.7 cm, about 2.8 cm, about 2.9 cm, about 3.0 cm, about 4 cm, about 5 cm, about 6 cm, about 7 cm, about 8 cm, about 9 cm, about 10 cm, and/or within a range defined by any two of the aforementioned values. It can be advantageous, for example, for the thickness of the outer portion 404 or one or more walls thereof to be within a range between about 0.5 cm and about 2.5 cm.

In some embodiments, one of the two opposing surfaces 406 and 410 may be facing a cathode, such as the cathode 104 of FIG. 1, and the other surface may be facing an anode of the zinc-air battery, such as the anode 102 of the zinc-air battery in FIG. 1. In some embodiments, one of the two opposing surfaces 406 and 410 may be adjacent to the cathode 104, and the other may be adjacent to the anode 102.

In some embodiments, the separator 400 can have a prismatic shape. In some embodiments, the separator 400 can have a curved shape, such as a circular or substantially circular shape. A shape of the separator 400 can be selected based on a corresponding shape of the zinc-air battery and/or other device parameters, such as desired device electrical performance. In some embodiments, the separator 400 can be a prismatic sheet. In some embodiments, the separator 400 can be sheet having a rounded shape.

Discharge of a Zinc-Air Battery

Figure 5:
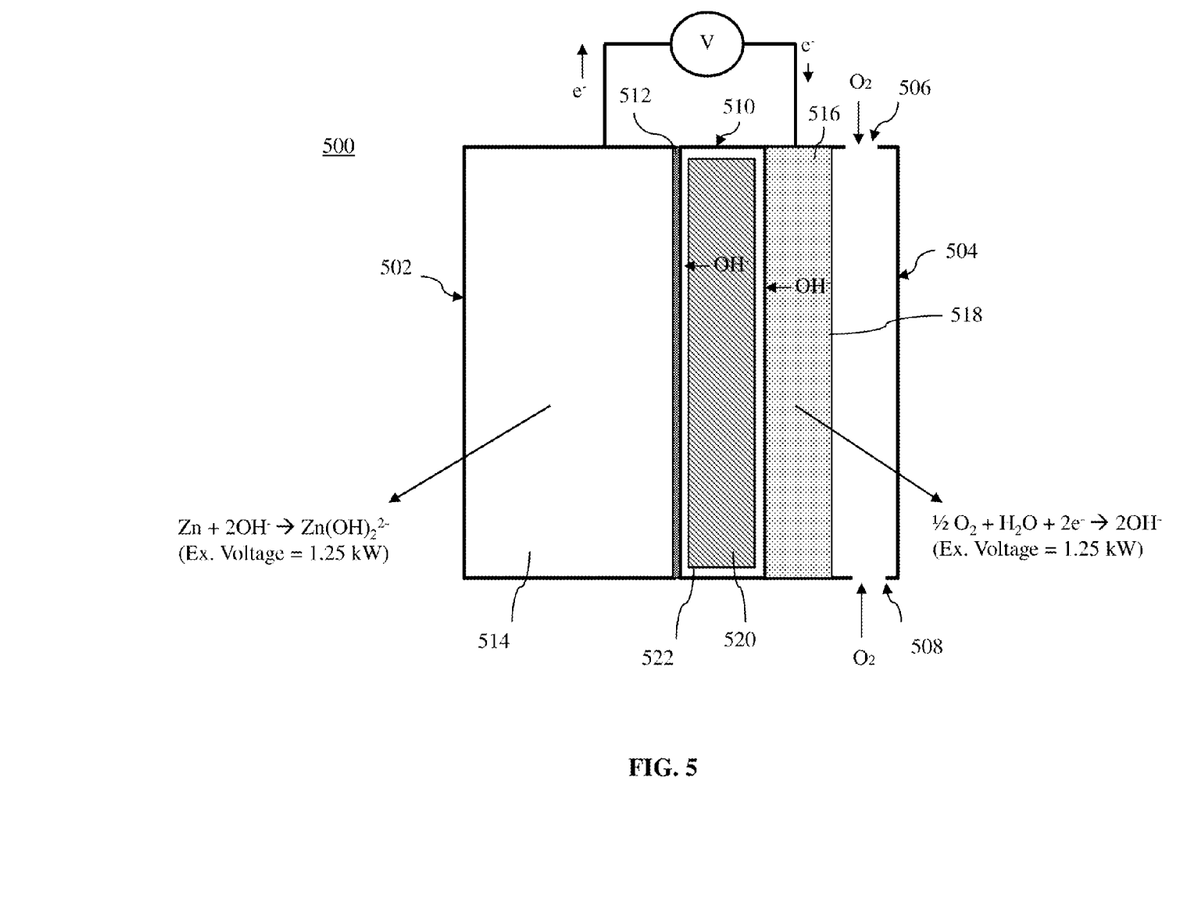
FIG. 5 is a schematic diagram showing discharge of an example of a zinc-air battery, according to some embodiments.

FIG. 5 is a schematic diagram illustrating discharge of an example of a zinc-air battery 500, according to some embodiments. The zinc-air battery 500 can include an anode 502, a cathode 504 and a separator 510 between the anode 502 and the cathode 504. The anode 502 may comprise a zinc-containing portion 514, for example a zinc metal sheet. The anode 502 may comprise a coating 512 on a surface of the zinc-containing portion 514. For example, the coating 512 may be an elemental nickel coating and may be alloyed onto the surface of the zinc-containing portion 514 which faces the cathode 504. The cathode 504 may include a portion 518 filled or substantially filled with a bifunctional catalyst 516, the bifunctional catalyst 516 being configured to catalyze both an oxygen gas evolution reaction and an oxygen gas reduction reaction. The cathode 504 may include a first opening 506 and a second opening 508 on opposing walls, the openings 506, 508 being configured to permit flow therethrough of ambient air such that oxygen gas in the ambient air can enter the cathode 504. The separator 510 may comprise an inner portion 520 surrounded or substantially surrounded by an outer portion 522, where the inner portion 520 may comprise a solid state polymer gel electrolyte and the outer portion 522 may comprise polysulfonium and magnesium oxide power distributed within the polysulfonium.

As shown in FIG. 5, oxygen gas can enter the cathode 504 through the first opening 506 and/or the second opening 508 of the cathode 504. The oxygen gas can then react with $H_2O$ present in the cathode 504 to produce hydroxide ions. For example, the oxygen gas can flow into the cathode 504 and then through the bifunctional catalyst 516 within the cathode 504 such that catalysis of the oxygen evolution reaction and oxygen reduction reaction can occur. The hydroxide ions can then travel to the anode 502 to react with the zinc at the anode 502 to generate electrons. For example, the hydroxide ions can travel through the separator 510 and the coating 512 to the zinc-containing portion 514 such that the hydroxide ions can react with the zinc of the zinc-containing portion 514 to produce electrons.

A zinc-air battery may comprise one, some, or all of the features described herein. In some embodiments, a zinc-air battery comprising one or more of the features described herein can demonstrate improved lifespan, energy efficiency, power density and/or rechargeability. As discussed herein, in some embodiments, the coating on one or more surfaces of the zinc-containing portion of the anode can be configured to reduce or prevent corrosion. A reduction in oxidation of the zinc-containing portion of the anode may facilitate a longer device lifespan, such as by facilitating improved physical and/or chemical integrity of the anode, and/or reduction in generation of undesired secondary byproducts. For example, oxidation of the zinc-containing portion may produce secondary byproducts, such as hydrogen gas, which can adversely impact device performance. In some embodiments, a zinc-air battery comprising the bifunctional catalyst can demonstrate improved energy efficiency and/or power density. For example, catalysis of the oxygen reduction reaction and/or the oxygen evolution reaction by the bifunctional catalyst may facilitate reduced self-discharge of the zinc-air battery, thereby increasing energy efficiency of the zinc-air battery. In some embodiments, catalysis of the oxygen reduction reaction and/or the oxygen evolution reaction by the bifunctional catalyst can reduce internal resistance, thereby providing improved power density. In some embodiments, the magnesium oxide containing separator can facilitate a reduced internal resistance, while providing a zinc-air battery which can maintain desired ionic communication between the battery electrodes and desired electrical performance under operation temperatures.

Zinc-air batteries having one or more features described herein may be formed into various shapes and/or sizes for a wide range of applications. For example, zinc-air batteries having one or more features described herein may be used to power mobile electronic devices, including mobile personal communication devices. The zinc-air batteries may be used to power other devices such as watches, cameras, and/or hearing aids. In some embodiments, the zinc-air batteries can be used in energy storage, such as energy storage for power grid applications. In some embodiments, zinc-air batteries as described herein can be used for various applications in the transportation industry, including for powering propulsion of electric motor vehicles such as electric cars and/or buses.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. In addition, while several variations of the embodiments of the invention have been shown and described in detail, other modifications, which are within the scope of this invention, will be readily apparent to those of skill in the art based upon this disclosure. It is also contemplated that various combinations or sub-combinations of the specific features and aspects of the embodiments may be made and still fall within the scope of the invention. It should be understood that various features and aspects of the disclosed embodiments can be combined with, or substituted for, one another in order to form varying modes of the embodiments of the disclosed invention. Any methods disclosed herein need not be performed in the order recited. Thus, it is intended that the scope of the invention herein disclosed should not be limited by the particular embodiments described above.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment. The headings used herein are for the convenience of the reader only and are not meant to limit the scope of the inventions or claims.

The ranges disclosed herein also encompass any and all overlap, sub-ranges, and combinations thereof. Language such as "up to," "at least," "greater than," "less than," "between," and the like includes the number recited. Numbers preceded by a term such as "about" or "approximately" include the recited numbers. For example, "about 3 mm" includes "3 mm."

The headings provided herein, if any, are for convenience only and do not necessarily affect the scope or meaning of the devices and methods disclosed herein.

What is claimed is:

1. A zinc-air battery comprising:
    an anode comprising a zinc-containing portion and a metal coating on at least one surface of the zinc-containing portion, wherein the metal coating comprises nickel;
    a cathode comprising one or more openings configured to allow air flow within the cathode and at least one unit of a bifunctional catalyst, wherein the bifunctional catalyst is configured to catalyze both an oxygen reduction reaction and an oxygen evolution reaction, wherein the bifunctional catalyst comprises an outer shell and an inner core, wherein the outer shell comprises nitrogen-doped carbon and the inner core comprises mesoporous perovskite lanthanum strontium cobalt oxide; and
    an electrically insulating separator between the anode and the cathode, wherein the insulating separator comprises magnesium oxide (MgO).

2. The zinc-air battery of claim 1, wherein the nitrogen-doped carbon comprises carbon nanotubes.

3. The zinc-air battery of claim 1, wherein the metal coating is on a surface of the zinc-containing portion opposite and facing the cathode.

4. The zinc-air battery of claim 3, wherein the metal coating is on a surface of the zinc-containing portion adjacent to the separator.

5. The zinc-air battery of claim 4, wherein the metal coating comprises about 70% zinc and about 30% nickel.

6. The zinc-air battery of claim 1, wherein the bifunctional catalyst is positioned in a ladder-like configuration within the cathode.

7. The zinc-air battery of claim 6, wherein the bifunctional catalyst is located within one or more portions within the cathode, wherein the one or more portions comprise a cylinder shape.

8. The zinc-air battery of claim 7, wherein the one or more portions extend from a single wall of the cathode.

9. The zinc-air battery of claim 1, wherein the electrically insulating separator comprises magnesium oxide (MgO) powder.

10. The zinc-air battery of claim 9, wherein the electrically insulating separator comprises an outer portion surrounding an inner portion, wherein the outer portion of the electrically insulating separator comprises the magnesium oxide powder.

11. The zinc-air battery of claim 10, wherein the outer portion comprises a polymer and wherein the magnesium oxide powder is distributed within the polymer.

12. The zinc-air battery of claim 11, wherein the polymer is polysulfonium.

13. The zinc-air battery of claim 10, wherein the inner portion of the electrically insulating separator comprises a solid state polymer gel electrolyte.

14. The zinc-air battery of claim 1 further comprising an electrolyte, wherein the electrolyte comprises potassium hydroxide and one or more gelling agents, wherein the one or more gelling agents are configured to limit passage of oxygen while facilitating ion mobility between the cathode and the anode.

15. The zinc-air battery of claim 1, further comprising one or more fans configured to facilitate air flow into and/or out of the cathode.

16. The zinc-air battery of claim 1, further comprising one or more pressure sensors configured to determine a pressure level within the cathode.

17. The zinc-air battery of claim 1, further comprising:
one or more pressure sensors configured to determine a pressure level within the cathode; and
one or more fans configured to facilitate air flow into and/or out of the cathode to maintain the pressure level within the cathode at a desirable level,
wherein the pressure level within the cathode determined by the one or more pressure sensors determines a desired speed of the one or more fans.

18. The zinc-air battery of claim 1, wherein the one or more openings are located on a single wall of the cathode.

19. The zinc-air battery of claim 1, wherein the cathode comprises porous carbon configured to facilitate air flow within the cathode.

* * * * *